(12) United States Patent
Bailey (10) Patent No.: US 8,209,140 B2
(45) Date of Patent: Jun. 26, 2012

(54) COOPERATIVE CALIBRATION OF HEADING SENSORS

(75) Inventor: Michael B. Bailey, Vail, AZ (US)

(73) Assignee: Raytheon Company, Waltham, MA (US)

( * ) Notice: Subject to any disclaimer, the term of this patent is extended or adjusted under 35 U.S.C. 154(b) by 289 days.

(21) Appl. No.: 12/641,031

(22) Filed: Dec. 17, 2009

(65) Prior Publication Data

US 2011/0153250 A1   Jun. 23, 2011

(51) Int. Cl.
    *G01C 17/38* (2006.01)
(52) U.S. Cl. ............ 702/94; 72/95; 72/104; 72/150; 72/158
(58) Field of Classification Search .......... 702/94–95, 702/152
    See application file for complete search history.

(56) References Cited

U.S. PATENT DOCUMENTS

| | | | |
|---|---|---|---|
| 4,031,630 A | 6/1977 | Fowler | |
| 5,440,484 A * | 8/1995 | Kao | 701/530 |
| 5,751,244 A * | 5/1998 | Huston et al. | 342/357.24 |
| 6,408,251 B1 * | 6/2002 | Azuma | 702/92 |
| 6,480,152 B2 * | 11/2002 | Lin et al. | 342/357.32 |
| 7,260,896 B2 | 8/2007 | Fillatreau | |
| 7,321,774 B1 * | 1/2008 | Lau et al. | 455/456.1 |
| 7,331,115 B2 | 2/2008 | Schierbeek | |
| 7,379,814 B2 | 5/2008 | Ockerse | |
| 7,458,166 B2 | 12/2008 | Parks | |
| 7,558,688 B2 * | 7/2009 | Schering et al. | 702/92 |
| 7,613,581 B2 | 11/2009 | Skvortsov | |
| 7,991,576 B2 * | 8/2011 | Roumeliotis | 702/159 |
| 2003/0158699 A1 * | 8/2003 | Townsend et al. | 702/151 |

FOREIGN PATENT DOCUMENTS

GB        002242093 A  *  9/1991

* cited by examiner

*Primary Examiner* — Drew A Dunn
*Assistant Examiner* — Mischita Henson
(74) *Attorney, Agent, or Firm* — Eric A. Gifford (57) ABSTRACT

A primary device that includes a heading sensor and a remote secondary device cooperate to calibrate the heading sensor. The secondary device cooperates by measuring its Earth relative position and transmitting the position to the primary device. The primary device calculates a true heading from the positions of both devices and subtracts the true heading from a measured heading to the secondary device to form a heading calibration angle. The process may be extended to calculate a pitch calibration angle.

19 Claims, 10 Drawing Sheets

COOPERATIVE CALIBRATION OF HEADING SENSORS

BACKGROUND OF THE INVENTION

1. Field of the Invention

This invention relates to heading sensors, and more particularly to the calibration of heading sensors.

2. Description of the Related Art

Heading sensors are used in a variety of applications such as personal handheld devices, automobiles, airplanes and boats. Heading sensors typically indicate a heading relative to true North although other references are also possible. The heading is typically specified as an azimuth angle from true North. Multi-dimensional sensors may also provide a pitch measurement. Pitch is typically specified as an elevation angle from the local level.

Heading sensors include magnetic compasses that sense the Earth's magnetic field and inertial compasses that exploit the Earth's rotation. A simple magnetic compass includes a magnetized pointer usually marked on the North end free to align itself with the Earth's magnetic field. A compensation, typically in the form of a declination table, is required to find true North. More sophisticated magnetic compasses may include multiple magnetometers positioned orthogonal to each other to provide full 3-axis measurements. A digital magnetic compass may include three magnetometers to measure magnetic fields in three axis and three accelerometers to measure and compensate for the tilt angle of the device. A simple inertial compass is essentially a gyroscope, a spinning wheel mounted on gimbals so that the wheel's axis is free to orient itself in any way. Torque is applied to the axis of the gyroscope causing the axis to process towards the North celestial pole. More sophisticated inertial compasses include multiple orthogonal gyroscopes to provide full 3-axis measurements. An inertial measurement unit (IMU) incorporates sensors to allow for measurement of translation and rotation in each of three axes. Typically the IMU is implemented with three accelerometers and three gyroscopes. The accelerometers are placed such that their measuring axes are orthogonal to each other. They measure inertial acceleration, also known as G-forces. Three gyroscopes are placed in a similar orthogonal pattern, measuring rotational position in reference to an arbitrarily chosen coordinate system. IMUs are typically used as part of inertial guidance systems to maneuver aircraft. Hybrid magnetic/inertial compasses that use a configuration of magnetometers and gyroscopes may be used. These more sophisticated compasses may provide more accurate heading measurements, pitch measurements and tilt compensation.

Heading sensors may be calibrated to ensure the sensor provides accurate measurements. Magnetic compasses may be calibrated to compensate for declination (the difference between magnetic north and true north), magnetic tilt or inclination (local deviation in the magnetic vector from magnetic north) and local magnetic fields (nearby magnetic objects) that distort the measurements. Declination is a function of geographic position and may be corrected by a constant correction factor for a particular geographic area. Tilt is a function of the roll and pitch of the compass. If the compass is provided with the necessary gravitational acceleration sensors tilt can be measured and largely removed via calibration. Local magnetic fields are a function of the local environment and in some cases can be removed via calibration. Typically, a sensor-specific procedure is provided to remove the local magnetic fields. Inertial sensors suffer from drift of the gyroscopes over time. Both magnetic and inertial sensors are characterized by measurement noise that cannot be removed.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a system and method of calibration of a heading sensor. The approach is sensor agnostic and may be used with any configuration of a magnetic, inertial or hybrid heading sensor. The approach is simple and efficient, simultaneously compensating for multiple sources of measurement error in a single calibration procedure with minimal demands placed on the operator.

This is accomplished with a "cooperative calibration" procedure between a primary device and a secondary device. The primary device includes a heading sensor, an optical sighting system (direct or indirect) with a fixed relative alignment to the heading sensor, an Earth relative position sensor and a communication link. The secondary device includes at least an Earth relative position sensor and a communication link. The secondary device may be manned or autonomous and may be another primary device. With the secondary device acquired by the optical sighting system, the heading sensor measures a sensed heading to the secondary device. From the Earth positions of the primary and secondary devices, the primary device's processor calculates a true heading to the secondary device and calculates the difference between the true and sensed headings as a heading calibration angle that is stored in memory. Depending on the heading sensor configuration, the procedure may also produce a pitch calibration angle. During use, the calibration angle(s) are retrieved from memory and summed with the measured angles to display corrected true heading and possibly pitch to the operator.

The primary device may be integrated with another system or all or a portion including at least the heading sensor may be provided as an appliqué that can be affixed to the system for calibration and than removed. For example, an appliqué may be attached to a weapons system to aim the system and then removed to fire. The device may be designed to store the calibrations in processor memory so that it is compatible with integration or use as an appliqué.

The same procedure is used for magnetic, inertial, hybrid magnetic/inertial or other heading sensors. The procedure addresses multiple sources of measurement error including mechanical alignment error between the sighting system and the heading sensor, local magnetic fields, magnetic tilt error, magnetic declination and gyro drift. Declination compensation may be achieved without the use of a declination table by treating declination as just another source of error. Error may be further reduced by time-synchronizing the Earth position measurements of the primary and secondary devices by, for example, utilizing the time code associated with GPS measurements.

For an operator the procedure may be as simple as point and shoot in which the operator points the sighting system to acquire the secondary device and positions a button to initiate cooperative calibration. A query is sent to the secondary device to measure and transmit its Earth position. The cooperation of the secondary device is required, cooperation may be automatic if the request is authenticated or may require the operator of the secondary device to accept the request. Alternately, the secondary device may broadcast its position periodically without request. If multiple secondary devices are in view, the primary operator may repeat the procedure to provide an average or weighted averaged calibration angle.

In another embodiment, the primary device also includes a range finder. A laser range finder (LRF) mounted so that it measures range along the same axis as the optical sighting system can be used to automatically calculate the location of a target. The primary device measures its location, measures and compensates the heading and pitch to the target and measures the range to target and calculates the location of the target from these measurements. As configured the primary device provides a very accurate and simple to use system for providing coordinates of a target.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a system and method of calibration of a heading sensor. The approach is sensor agnostic in that it may be used with any configuration of a magnetic, inertial or hybrid heading sensor. The approach is simple and efficient, simultaneously compensating for multiple sources of measurement error in a single calibration procedure with minimal demands placed on the operator. The approach is effective for both simple compass configurations to determine current heading and for more sophisticated heading sensor that must precisely measure heading and pitch as part of a far target locator for a weapons platform.

The approach is based on the concept of "cooperative calibration" between the primary device that includes the heading sensor being calibrated and a secondary device. The secondary device cooperates by measuring its Earth relative position and transmitting the position to the primary device. The primary device calculates a true heading from the positions of both devices and subtracts the true heading from a measured heading to the secondary device to form a heading calibration angle that is stored in memory. The process may be extended to calculate a pitch calibration angle.

Referring now to FIGS. 1 through 5, a primary device 10 provides heading, by convention referenced to true North, and possibly pitch measurements. Heading is typically specified as an azimuth angle referenced to true North. Pitch is typically specified as an elevation angle referenced to local level. In this embodiment the primary device is configured as a far target locator that combines positioning, heading (heading and pitch) and ranging capabilities to determine the coordinates of a target. The primary device may be provided as a hand held unit or mounted on a platform e.g. a vehicle or weapons platform. The primary device may be permanently affixed to the vehicle or weapons platform or provided as an appliqué that can be mounted to make a heading measurement and removed. The primary device components provided as the appliqué would include at least the heading sensor depending on the platform. If mounted on a platform aiming of the primary device may be manually controlled by a human operator or automatically controlled by the platform.

Figure 2A:
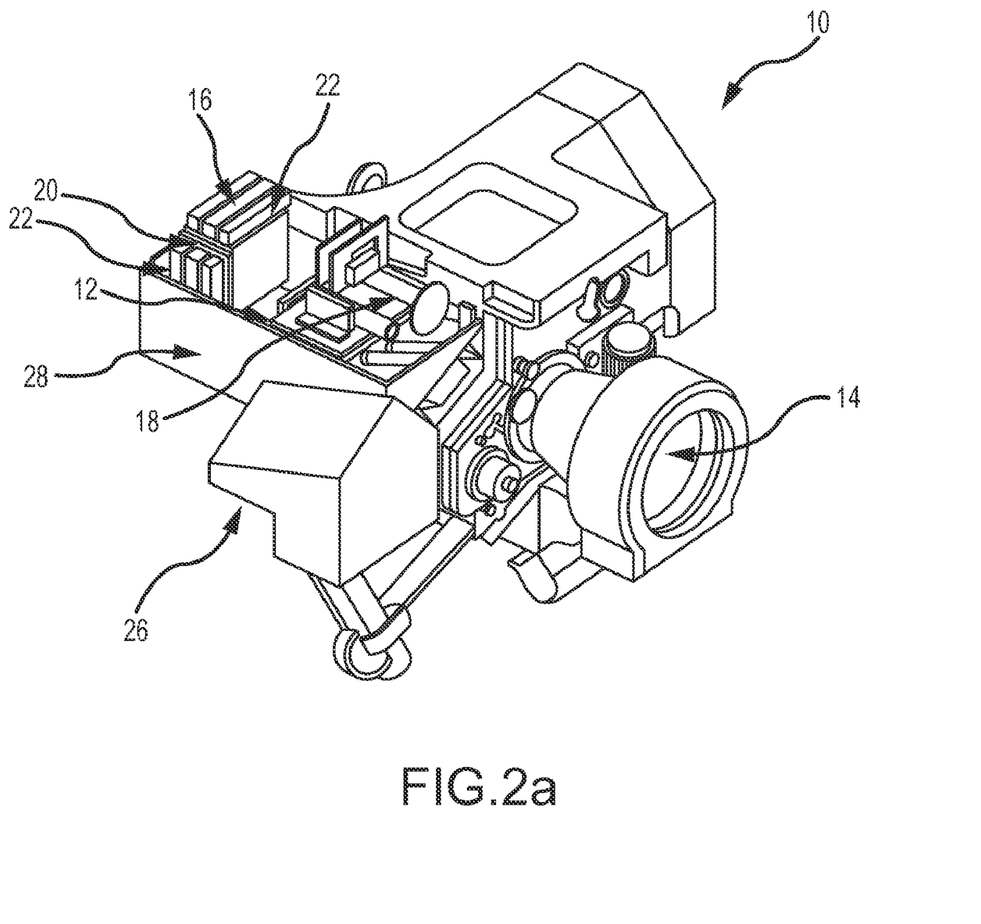
FIGS. 2a and 2b are a perspective view and block diagram of an embodiment of a primary device.
Figure 2B:
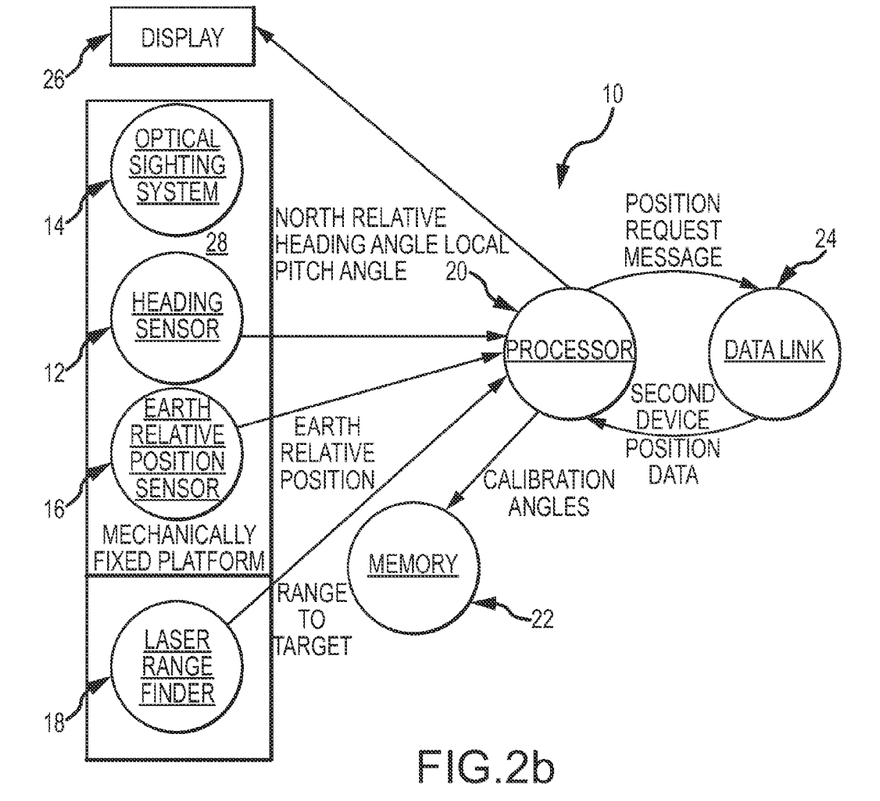

Primary device 10 includes a heading sensor (HS) 12, an optical sighting system 14 having a fixed relative alignment to the heading sensor, an Earth relative position sensor 16, a range finder 18, one or more processors 20, memory 22, a data link 24 and a display 26 all mounted on a device platform 28. The range finder is required as part of the far target locator but is not required for either calibration or use of the heading sensor as a compass.

Heading sensor 12 is suitably a device capable of measuring its orientation in three axes. The heading sensor may include a magnetic compass, an inertial compass or a hybrid magnetic/inertial compass. The sensor-specific reference frame, which is determined by the relative mounting of individual magnetometers and accelerometers for a magnetic compass and gyroscopes and accelerometers for an inertial compass, is typically converted internally to provide measurements of heading, pitch and roll in a local level reference frame. Heading is suitably referenced to true North for rotations around the vertical axis in the local level reference frame.

Optical sighting system 14 allows the primary device to be aimed at and acquire a particular target allowing the heading sensor to measure the heading and pitch from the primary device to the target. A direct view system such as an optical telescope relies on visible light to allow the operator to visualize the target. An indirect view system includes any viewing device in which there is an intervening sensor between the target and the operator. The most common indirect systems are IR and visible but UV is possible. A human operator may aim the primary device, whether hand held or mounted on a platform, at the target. Alternately, an automated tracking system may be used to aim the primary device.

Earth relative position sensor 16 is a sensor that measures its position relative to a fixed earth coordinate system. The coordinate system may be provided by the device in either polar or Cartesian systems. Typically, the processor 20 is configured to convert back and forth between the polar and Cartesian system. Several satellite based systems such as the U.S. GPS ("Global Position System"), Russian GLONASS ("GLObal Navigation Satellite System"), Chinese compass system and EU Galileo systems measure position relative to a fixed Earth coordinate system. Loran ("LOng RAnge Navigation") is a terrestrial radio navigation system uses multiple low frequency radio transmitters to determine the location of the receiver. At least GPS provides a time-code with the position measurements. The position sensor may therefore comprise a GPS or other receiver that interacts with the network (e.g. a satellite 29) to determine receiver position.

Range finder 18 measures the range to a particular target. When used in conjunction with the position sensor and heading sensor, the primary device can calculate the position of the particular target in the fixed earth coordinate system (see FIG. 9). Range finder 18 may comprise a laser range finder (LRF) mounted to measure range along the same axis as optical sighting system 14.

Data link 24 may be a wired network such as Ethernet or a wireless network such as RF and may be a point-to-point link or a multipoint network. The link is suitably capable of transmission of digital data.

Display 26 displays the heading and pitch to the operator. The display may also display the position of the particular target. If the optical sighting system is an indirect view system, the same display may be configured to display an image of the particular target. The numeric heading and pitch, and possibly position may be overlaid on the image of the target. The display may display a menu including an icon or button for "cooperative calibration". Operator selection of button initiates the gathering of data and calculation to update the calibration angles stored in memory.

Processor 20 includes one or more computer processors. Memory 22 includes one or more memory devices. The memory devices may be processor memory or separate memory and may be volatile or non-volatile. To calibrate the heading sensor, processor(s) 20 may be configured to issue, in response to operator initiation, a request for cooperative calibration with a secondary device 30. Processor(s) 20 are configured to receive position measurements of the secondary and primary devices and calculate a true heading and pitch. Processor(s) 20 are configured to receive heading and pitch measurements from heading sensor 12 and subtract the true and measured heading and pitch to form heading and pitch calibration angles. See FIGS. 6a-6c and 7a-7b for an embodiment of this calculation. Processor(s) 20 may be configured to average measurements from multiple secondary devices to improve the calibration angles (see FIGS. 8a-8b). To use the calibrated heading sensor, processor(s) 20 are configured to receive the heading and pitch measurements from the heading sensor, retrieve the calibration angles, apply them to the measures to form true heading and true pitch and display them. In the far target locator embodiment, the processors are configured to receive the position of the primary device, the true heading and true pitch and the range to target and calculate the position of the target (see FIG. 10).

Figure 1:
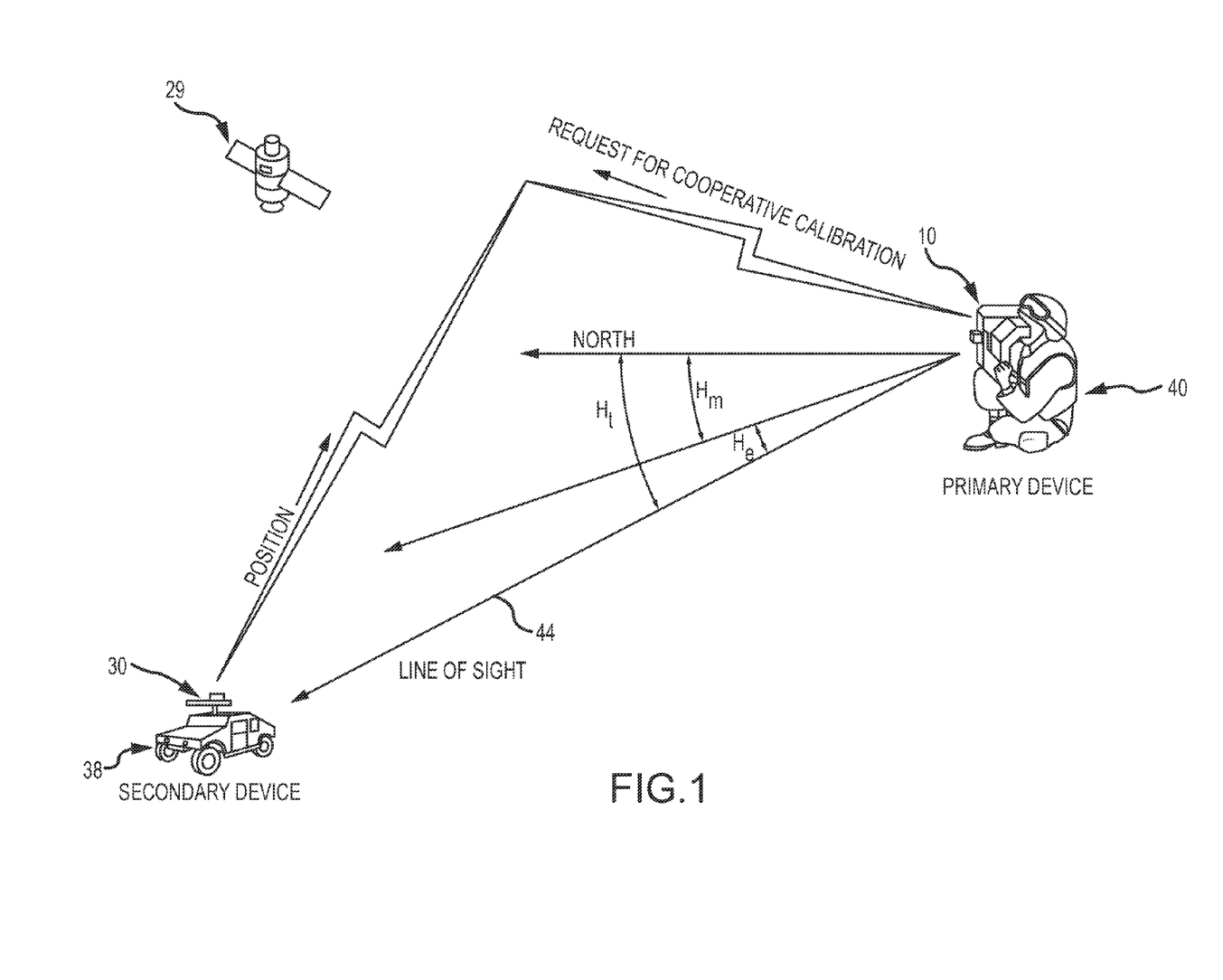
FIG. 1 is a diagram of a fielded primary device including a heading sensor engaged in cooperation cooperative calibration with a secondary device in accordance with the present invention.
Figure 3:
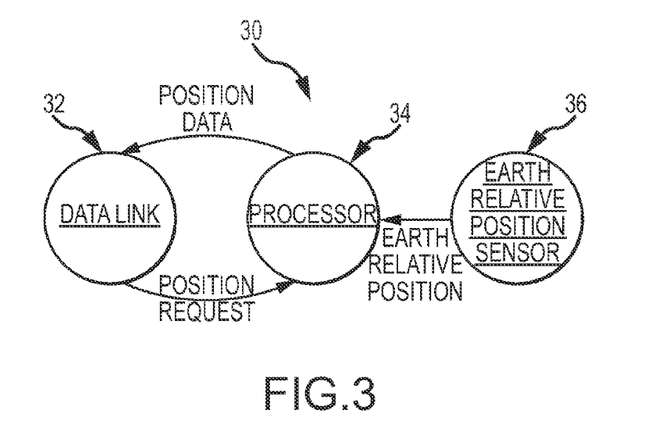
FIG. 3 is a block diagram of a secondary device.

Secondary device 30 provides a known reference that can be used to determine both a measured and true heading from which to derive the calibration angles. As shown in FIG. 3, secondary device 30 includes a data link 32, one or more processors 34 and an Earth relative position sensor 36, which may or may not be the same type of sensor in the primary device. The secondary device may be mounted on a platform such as a vehicle 38 as shown in FIG. 1 or could be a hand held unit. The secondary device may be another primary device of the same or different configuration than primary device 10. The secondary device may have a human operator or may be autonomous.

Processor 34 is configured to receive an Earth relative position measurement from sensor 36 and transmit the position measurement via data link 32 to the primary device. In an embodiment, processor 34 is configured to receive a request for cooperative calibration from the primary device via the data link. This request may either be automatically authenticated and processed to return the position measurement or may require an operator of the secondary device to accept cooperative calibration. In an alternate embodiment, the secondary device 30 is configured to broadcast its position periodically.

Figure 4:
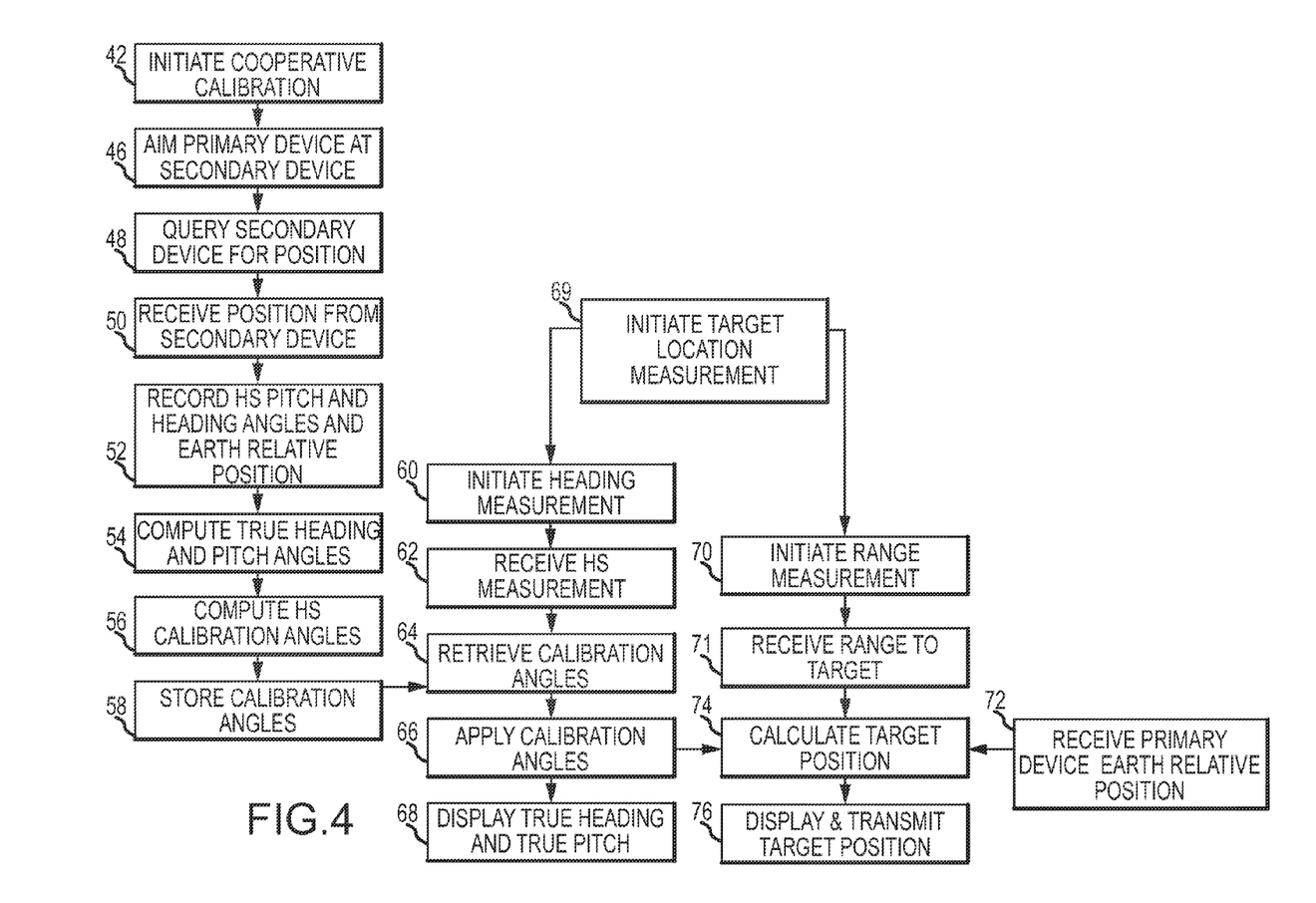
FIG. 4 is a flow diagram for cooperative calibration and use of the primary device.

Referring now to FIGS. 1 and 4, an operator 40 initiates "cooperative calibration (step 42) of the primary device heading sensor by, for example, selecting the calibration icon or button on a displayed menu. In this embodiment, operator 40 aims the primary device 10 at secondary device 30 to visually acquire the secondary device along a line-of-sight. 44 and measures sensed heading (Hm) and pitch (step 46), sends a request via the communication links to query the secondary device for its position (step 48) and receives the position back via the communication links (step 50). The primary device records the sensed heading and pitch and Earth relative position of the primary and secondary devices (step 52).

From the positions of the primary and secondary devices, the primary device processor calculates a true heading (Ht) and true pitch from the primary device to the secondary device (step 54). The true heading Ht is the azimuth angle between the LOS 44 to the secondary device and true North. The true pitch is the elevation angle in local level from the primary to the secondary devices. The Earth relative position sensors will have some amount of position error. Because the primary and secondary devices are relatively close to each other they experience a similar position offset at a given time. If the Earth relative position sensors provide a time code with the position measurements, the processor can synchronize the calculation by selecting position measurements made at the same time. Subtraction of the two positions removes some of the position offset. Because the angle error calculation is dependent on relative rather than absolute position errors the angle error calculation will be more accurate than is possible with a single GPS receiver on the primary device or with unsynchronized position sensors.

In this embodiment, the heading and pitch measurements by the heading sensor and the position measurements by the Earth relative position measurements are performed at roughly the same time. Alternately, the measurements may be performed in sequence in either order. The only requirement is that the primary and secondary devices must be in the same position when both sets of measurements are made.

The primary device processor calculates the heading calibration angle and pitch calibration angle (step 56) by subtracting the true and sensed heading and pitch, respectively. The processor records the heading calibration angles in memory to compensate further heading and pitch measurements (step 58). In the case of a magnetic compass such as a DMC all of the errors sum to a single offset. This is the fastest way to measure and combine all of the error sources at one time. In the case of an inertial compass such as an IMU, gyros and accelerometers are used to sense the earth's rotation rate as measured in a three dimensional triad of sensors. The amount of rate measured in each channel is combined, i.e. the magnitude of rate in each of the three channels is summed to determine the direction of travel relative to the axis of the sensors. This single measurement can for example account for a mechanical misalignment between the sensor axis and the sighting axis. Therefore the calibration angle (heading and pitch) is separated into the axial components and stored.

To use the calibrated primary device, the primary device is pointed along a desired line of sight and the heading sensor measures the sensed heading and pitch along that line of sight (step 60). The primary device may be pointed forward in the direction the operator or platform is oriented to determine current heading or may be pointed at a particular target to determine heading (and pitch) from their current position to the particular target. Heading sensor may continuously generate heading and pitch measurements or may generate discrete measurements in response to a command to initiate heading measurement e.g. the operator selects an "initiate heading measurement" icon on the displayed menu. The primary device processor receives the sensed heading and pitch measurements (step 62), retrieves the calibration angles from memory (step 64) and sums the sensed and calibration angles to provide true heading and true pitch (step 66). The processor causes the true heading and true pitch to be displayed on the display (step 68).

In the far target locator embodiment, the processor initiates target location measurement (step 69), initiates range measurement (step 70) and receives the range to target (step 71) and the primary device Earth relative position (step 72) and uses the primary position and heading, pitch and range to target to calculate the target position (step 74). The processor causes the target position to be displayed on the display and transmits the target position to a weapons platform. The weapons platform may be attached to the primary device or may be remote.

Cooperative calibration of a primary device heading sensor using the line of sight to and measured Earth relative position of a secondary device provides certain benefits. The approach is agnostic to the technology employed by the heading sensor whether it be magnetic, inertial or some combination thereof. To perform cooperative calibration the actions taken by the human operator are limited. Essentially the operator is only required to aim at the target and initiate the calibration sequence. All other steps are automated. The operator is not required to refer to any maps or tables in order to calibrate the primary device and heading sensor. Multiple sources of error are addressed with a single calibration.

Figure 5A:
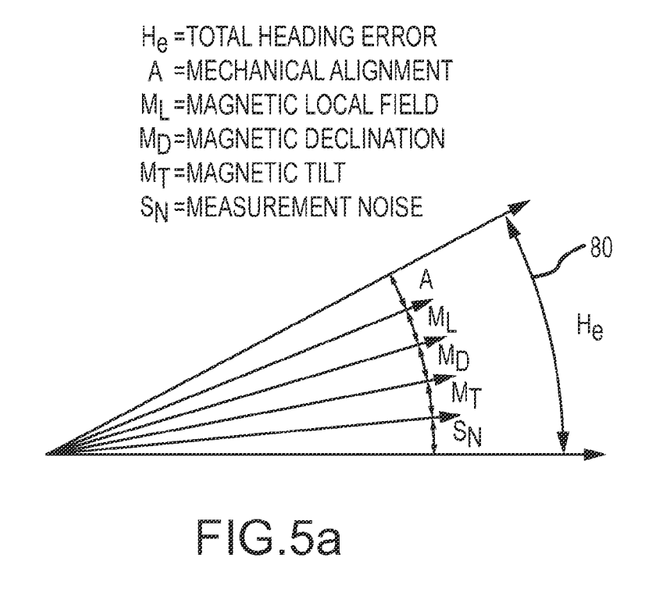
FIGS. 5a and 5b are diagrams illustrating the components of heading error in the measured heading for a digital magnetic compass and an IMU, respectively.
Figure 5B:
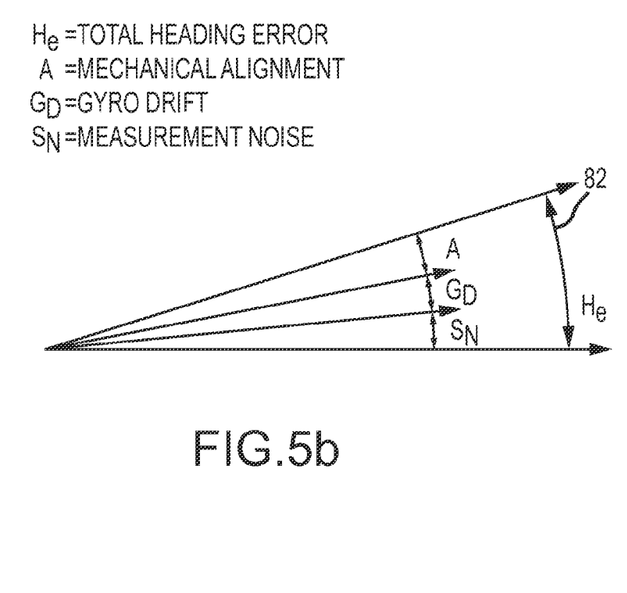

As shown in FIGS. 1 and 5a, the heading error (He) 80 for a magnetic compass, which is the difference between the true heading Ht and sensed heading Hm, includes multiple sources of error: A mechanical alignment between the sighting system and heading sensor, $M_L$ magnetic local field, $M_D$ magnetic declination, $M_T$ magnetic tilt (inclination) and $S_N$ measurement noise. Pitch error includes mechanical misalignment and magnetic tilt. As shown in FIG. 5b, heading error He 82 for an inertial compass includes A mechanical alignment, $G_D$ gyro drift and $S_N$ measurement noise. Cooperative calibration effectively lumps all of the sources of error together and provides a calibration angle that substantially accounts for all of the error except measurement noise $S_N$.

An embodiment of the calculations performed by the processor to determine the true heading and true pitch and heading and pitch calibration angles is illustrated in FIGS. 6a-6c and 7a-7b. The described approach uses certain frames of reference in which the measurements are provided and the calculations are made. Other embodiments may use different frames of reference to make the initial measurements and different coordinate transformations with which to perform the calculations.

Figures 6A, 6B, 6C:
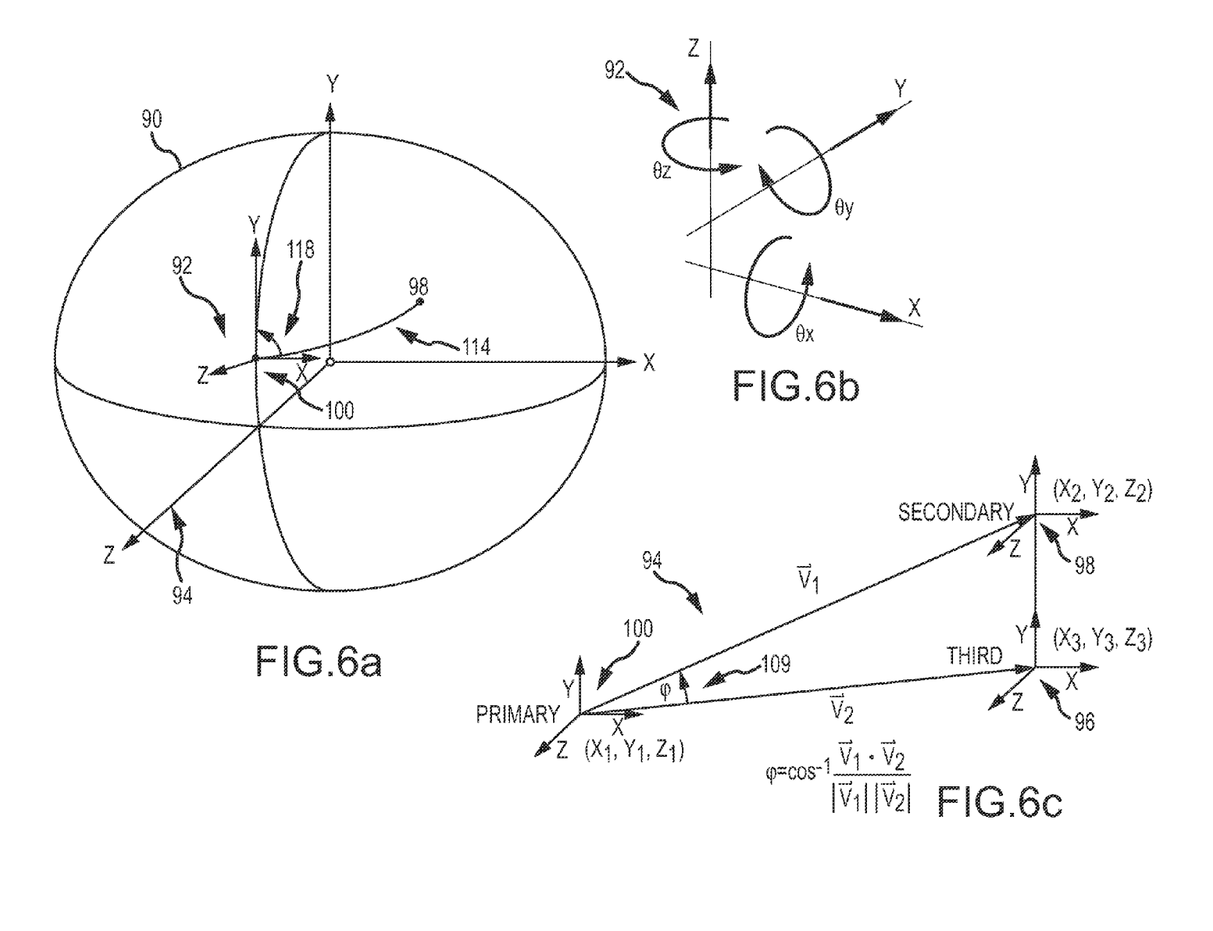
FIGS. 6a through 6c are illustrations of an ellipsoidal earth model, local level frame of reference and an Earth centered earth fixed (ECEF) frame of reference, respectively.

As shown in FIG. 6a, the Earth is represented with an ellipsoidal Earth model 90. An Earth relative coordinate system has its origin at the center of the ellipsoidal Earth model and is represented in angle form using latitude, longitude and elevation.

As shown in FIGS. 6a and 6b, a local level coordinate frame 92 is a 3-axis rotational frame where the pitch and roll rotations have zero rotation when they are parallel to a plane which is tangent to the earth ellipsoid 90. The origin of the local level coordinate frame is the position of the primary device. The heading axis (Z-axis) is orthogonal to the earth ellipsoid and referenced to north. More specifically, pitch is the angle of rotation $\Theta_x$ about the x-axis, roll is the angle of rotation $\Theta_y$ about the y-axis and heading is the angle of rotation $\Theta_z$ about the z-axis. Because the y-axis is used as the pointing axis for the optical sighting system roll is effectively removed from the calibration and use calculations. If the reference frames are defined differently, roll may cross-couple into heading or pitch. In this case, roll would need to be calibrated as well.

As shown in FIGS. 6a and 6c, an Earth Centered Earth Fixed (ECEF) coordinate frame 94 is a Cartesian coordinate frame with its origin at the center of the earth ellipsoid. 90 The positive z axis points up through the North pole, the x axis points through the intersection of the prime meridian and the equator. The Y axis points through the intersection of the due east meridian and the equator.

In this embodiment, the primary device operates in the local level coordinate frame 92 to display heading and pitch, and possibly target position to the user. The Earth relative position sensors provide position data for the primary and secondary devices in either geodesic latitude/longitude/elevation 90 or ECEF 94 or possibly both. The processor is capable of transforming back and forth between these coordinate frames.

Figure 7A:
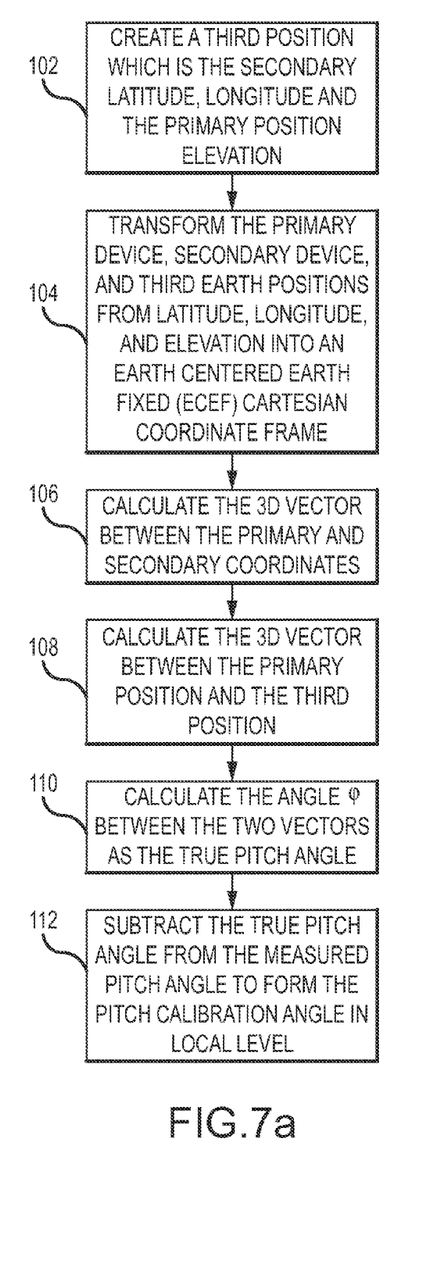
FIGS. 7a and 7b are flow diagrams for an embodiment for calculating the pitch and heading calibration angles, respectively.

Referring now to FIG. 7a, the processor calculates true pitch and the pitch calibration angle by creating a third position 96 which has the latitude and longitude of the secondary position 98 and the elevation of the primary position 100 (step 102). The processor transforms the primary device, secondary device, and third earth positions from Latitude, Longitude, and Elevation into ECEF Cartesian coordinate frame 94 (step 104). The processor calculates the 3D vector $\nabla_1$ between the primary position 100 and secondary position 98 (step 106) and calculates the 3D vector $\nabla_2$ between the primary position 100 and the third position 96 (step 108). The processor calculates the angle $\phi$ 109 between the two vectors as the true pitch angle (step 110). The processor subtracts the true pitch angle from the measured pitch angle to form the pitch calibration angle in local level coordinate frame 92 (step 112).

Figure 7B:
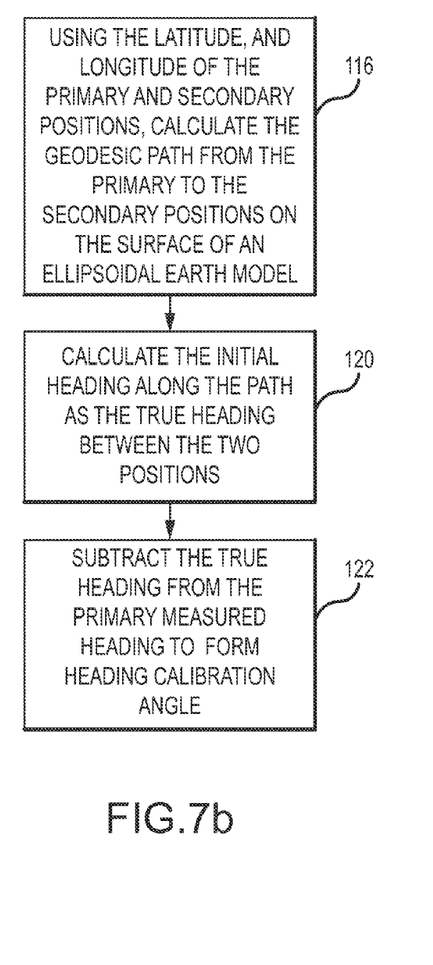

Referring now to FIG. 7b, the processor calculates true heading and the heading calibration angle by using the latitude and longitude of the primary and secondary positions 100 and 98 to calculate the geodesic path 114 from the primary to the secondary positions on the surface of an ellipsoidal earth model 90 (step 116). The processor calculates the initial heading 118 along this path as the true heading between the two positions (step 120). The processor subtracts the true heading from the primary measured heading to form the heading calibration angle (step 122).

Figure 8A:
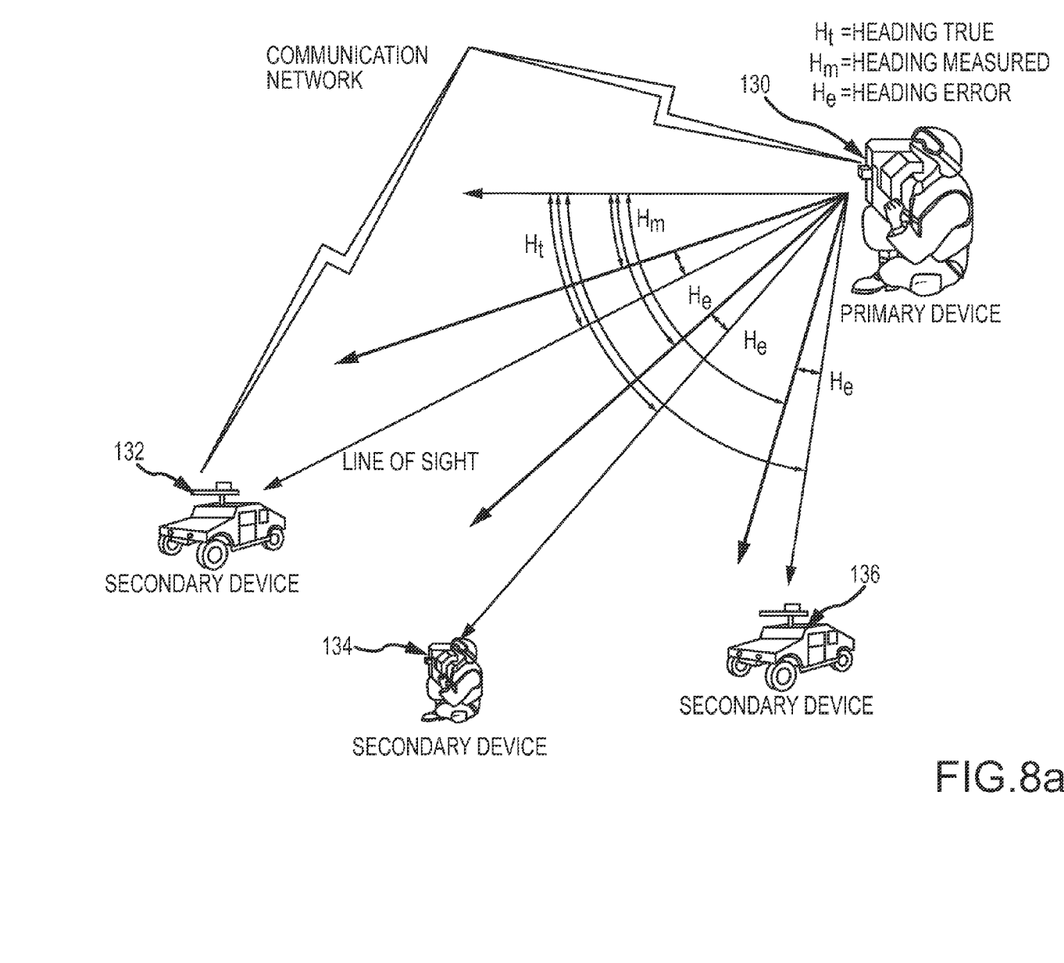
FIGS. 8a and 8b are fielded and flow diagrams of a primary device engaged in cooperation cooperative calibration with multiple secondary devices.
Figure 8B:
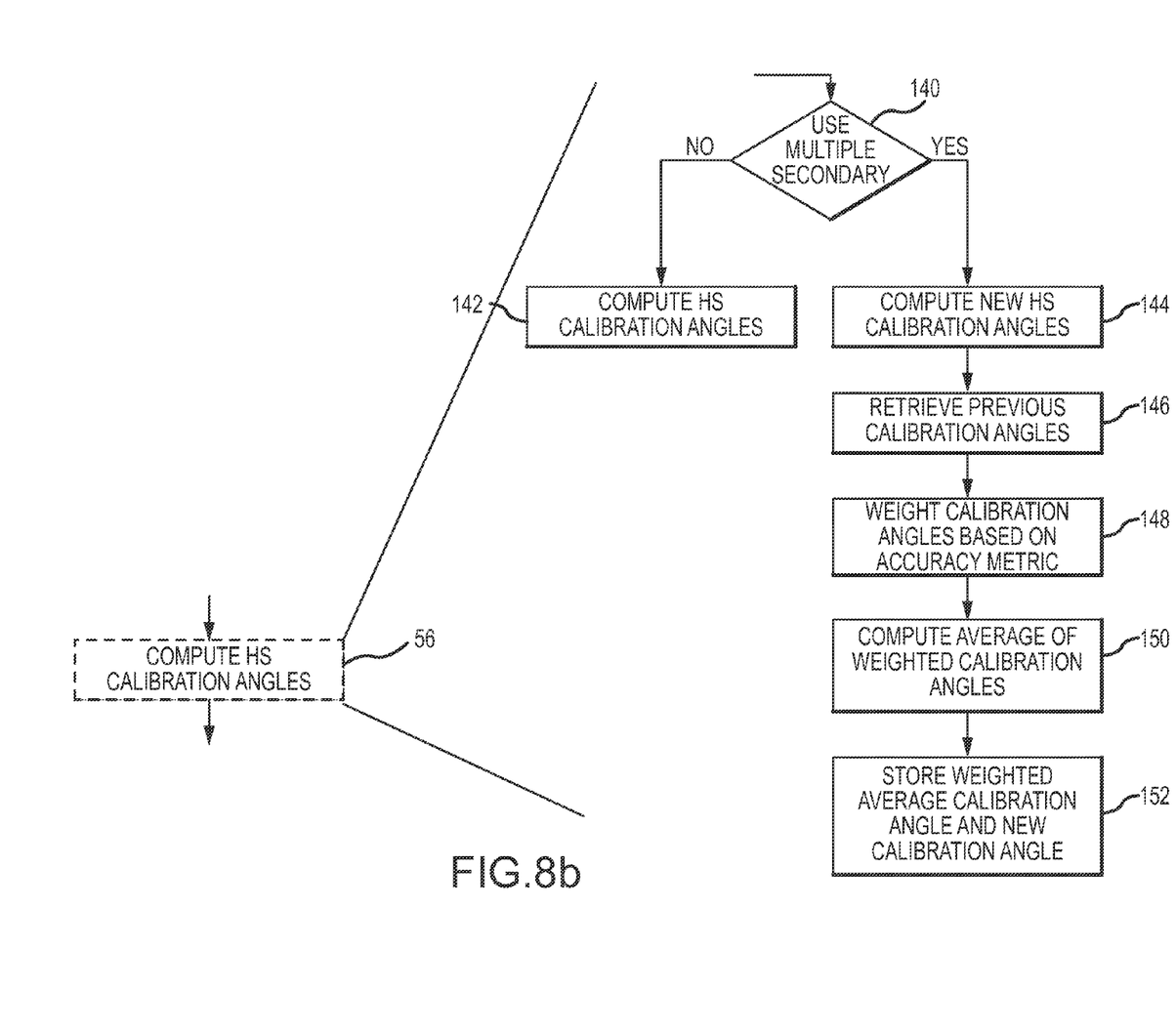

Referring now to FIGS. 8a and 8b, to further improve the accuracy of the heading and pitch calibration angles the cooperative calibration procedure for a primary device 130 may be repeated for multiple secondary devices 132, 134 and 136 and the calibration angles averaged together. The same secondary device may move and for purposes of calibration constitute another secondary device. The contributions of the various calibration angles may be equally weighted or weighted based on an accuracy metric assigned to each angle. The accuracy metric may be a function of one or more of the accuracy of the earth relative position sensors, the heading sensor, the distance between the primary and secondary and the elevation difference between the primary and secondary.

In general, the errors associated with each type of sensor on both the primary and secondary devices are weighted based on knowledge of the sensors' measurement implementation and the resulting inherent accuracy limitations of their measurement results and the relative positions of the primary and secondary devices at the time of the compensation measurement.

Estimated accuracy is dependent on the accuracies of the earth position and heading sensors, and the relative position of the primary and secondary devices. Earth positioning systems have various errors in their position solutions. These errors have a direct effect on the angle measurements made during the compensation sequence causing them to lose accuracy. Greater separation of the primary and secondary devices minimizes the effects of these errors. In this case calibration factors from multiple secondary devices that were at a greater distance from the primary device would be given a higher weight in the averaging.

Further refinement of the weighting factor is applied based on the inherent accuracy of the earth position system in use. In a mixed earth position sensor environment some secondary devices may have more precise earth position sensors integrated, for example one sensor may have commercial GPS while another utilizes military grade GPS. In this case, the secondary with the more accurate GPS is given a higher weight when combining successive compensation measurements.

Similar weighting is applied depending on the type of heading sensor used. Some heading sensors' measurements increase in error with greater pitch or roll angles. In this case, compensation sequences performed with secondary devices located in elevation closer to the primary device's elevation would be given a higher weight.

Referring now to FIG. 8b, step 56 of computing heading sensor calibration angles from FIG. 4 is expanded to show the option of computing the angles from a single or multiple secondary devices. The processor determines in step 140 whether multiple secondary devices will be used for calibration. This may be accomplished in different ways. One approach is to prompt the operator to select single or multiple secondary devices from the initiation menu and, if multiple, to specify the number of devices. Another approach is to average any new measurements with the existing measurements provided the position of the primary device has not changed by more than a specified amount. Movement of the primary device may affect the local magnetic fields, declination and inclination. The processor may be configured to store the positions of the primary device with the calibration angles and compare the positions to determine whether to average new measurements with old or whether to reset the calibration angles.

If the processor determines that only a single secondary device will be used, the processor computes the heading sensor calibration angles as previously described (step 142). If the processor determines that the new calibration angles will be averaged with existing calibration angles, the processor computes new calibration angles using the previously described technique (step 144). The processor retrieves one or more previously calculated and stored calibration angles (step 146). The processor may weight each calibration angle based on an accuracy metric (step 148). The default may be to weight each angle uniformly. The processor computes the average of the weighted calibration angle (step 150). The processor stores the weighted average calibration angle for compensation of further heading and pitch measurements and stores the new calibration angle in order to make further refinements to the weighted average calibration angle (step 152).

Figure 9:
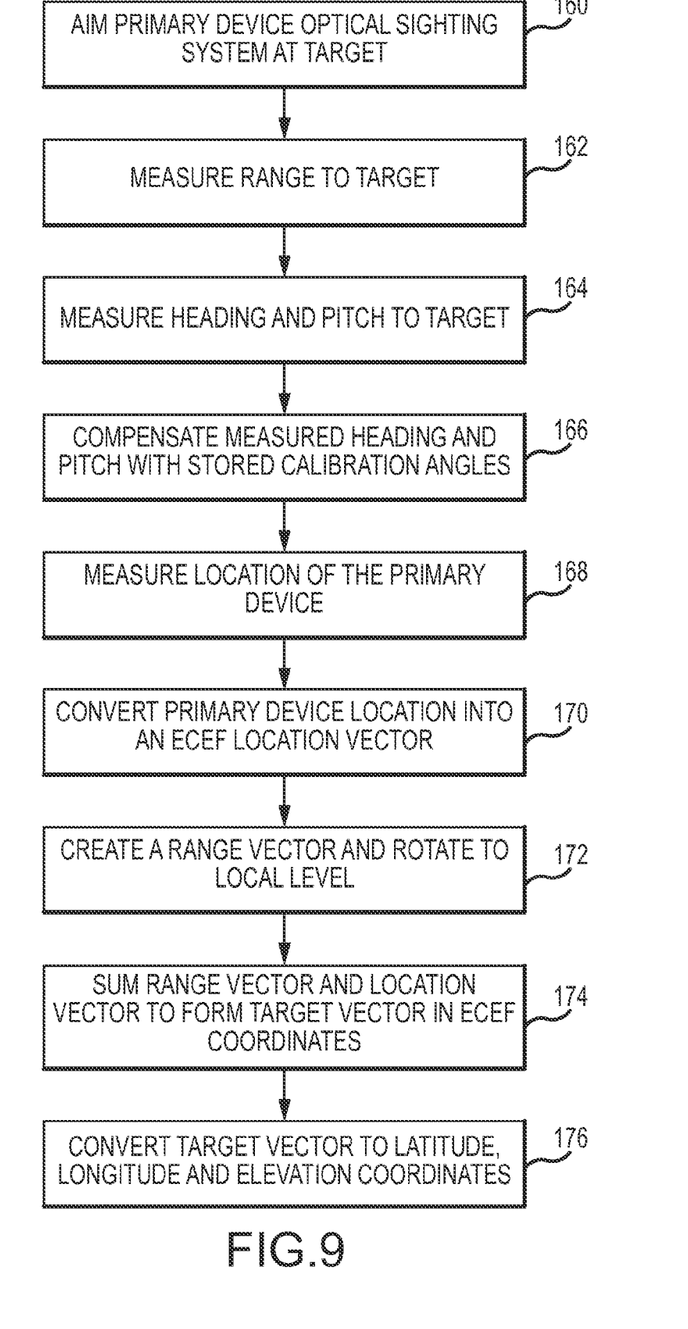
FIG. 9 is a flow diagram for an embodiment for calculating the position of a target.

Referring now to FIG. 9, the far target locator may automatically calculate the location of a target. The primary device optical sighting system is aimed at and visually acquires the target (step 160). The laser range finder measures the range to the target (step 162). The heading sensor measures the heading and pitch to the target (step 164). The processor compensates the measured heading and pitch with the stored calibration angles (step 166). The Earth relative position sensor measures the location of the primary device (step 168). The processor converts the latitude, longitude and elevation of the primary device into ECEF coordinates to provide an ECEF location vector (step 170), creates a range vector the length of the measured range and rotates the range vector into local level using the latitude, longitude, true heading and pitch for the current position (step 172), and sums the range vector with the ECEF location vector to provide a target vector (step 174). The processor converts the target vector from ECEF coordinates to latitude, longitude and elevation, or other geo-locating coordinate systems such as Military Grid Reference System to provide target location (step 176).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of cooperative calibration of a heading sensor, comprising:
    (a) providing a primary device including a heading sensor that provides measurements of heading, an optical sighting system with a fixed relative alignment to the heading sensor, a position sensor, a processor, memory and a communication link;
    (b) providing a secondary device including a position sensor and a communication link;
    (c) aiming the primary device's optical sighting system to acquire the secondary device;
    (d) measuring with said heading sensor a sensed heading and a sensed pitch from the primary device to the secondary device;
    (e) measuring with the respective position sensors the positions relative to a fixed Earth coordinate system of said primary and secondary devices;
    (f) receiving at said primary device via the communication links the position of the secondary device;
    (g) from said positions of said primary and secondary devices, calculating with said processor a true heading and a true pitch from the primary and secondary positions;
    (h) subtracting with said processor the true and sensed headings to form a heading calibration angle and the sensed and true pitch to form a pitch calibration angle; and
    (i) recording the heading calibration angle and the pitch calibration angle in said memory to compensate further heading and pitch measurements.

2. The method of claim 1, wherein said processor creates a third position having the latitude and longitude of the secondary device and the elevation of the primary device, transforms the position of the primary device, secondary device and third position into Earth centered Earth Fixed (ECEF) coordinates, calculates a first vector between the primary and secondary positions, calculates a second vector between the primary and third positions, calculates an angle between the first and second vectors as a true pitch and subtracts the sensed and true pitch to form a pitch calibration that is stored in memory.

3. A method of cooperative calibration of a heading sensor, comprising:

(a) providing a primary device including a heading sensor that provides measurements of heading, an optical sighting system with a fixed relative alignment to the heading sensor, a position sensor, a processor memory and a communication link;

(b) providing a secondary device including a position sensor and a communication link;

(c) aiming the primary device's optical sighting system to acquire the secondary device and transmitting a request for cooperative calibration via the communication links to said secondary device to measure its position and transmit the position via the communication links back to the primary device;

(d) measuring with said heading sensor a sensed heading to the secondary device;

(e) measuring with the respective position sensors the positions of said primary and secondary devices;

(f) receiving at said primary device via the communication links the position of the secondary device;

(g) from said positions of said primary and secondary devices, calculating with said processor a true heading from said primary device to said secondary device;

(h) subtracting with said processor the true and sensed headings to form a heading calibration angle; and (i) recording the heading calibration angle in said memory to compensate further heading measurements.

4. The method of claim 3, wherein said primary and secondary position sensors measure position relative to a fixed Earth coordinate system.

5. The method of claim 4, wherein said primary and secondary position sensors comprise Global Positioning System (GPS) receivers that provide position measurements with a time code, said processor calculating the true heading from time synchronized measurements of the positions of the primary and secondary devices.

6. The method of claim 4, wherein said processor uses the latitude and longitude of the primary and secondary positions to calculate a geodesic path from the primary to the secondary position on the surface of an ellipsoidal Earth model and provides the initial heading along this path as the true heading.

7. The method of claim 3, further comprising:
aiming the primary device's optical system to acquire a different secondary device;
repeating steps (d) through (h) to compute another heading calibration angle;
averaging with said processor the heading calibration angles; and
storing the average heading calibration angle in said memory.

8. The method of claim 3, wherein said heading sensor comprises at least one magnetometer and at least one gyroscope.

9. The method of claim 3, wherein said processor calculates the heading calibration angle without use of a declination table.

10. A method of cooperative calibration of a heading sensor, comprising:
(a) providing a primary device including a heading sensor that provides measurements of heading, an optical sighting system with a fixed relative alignment to the heading sensor, a position sensor, a processor, memory and a communication link;
(b) providing a secondary device including a position sensor and a communication link;
(c) aiming the primary device's optical sighting system to acquire the secondary device;
(d) measuring with said heading sensor a sensed heading to the secondary device, wherein said heading sensor comprises at least one magnetometer to sense the Earth's magnetic field and measure the sensed heading to the secondary device;
(e) measuring with the respective position sensors the positions of said primary and secondary devices;
(f) receiving at said primary device via the communication links the position of the secondary device;
(g) from said positions of said primary and secondary devices, calculating with said processor a true heading from said primary device to said secondary device;
(h) subtracting with said processor the true and sensed headings to form a heading calibration angle, said calculation of the heading calibration angle from the true and sensed heading encompassing errors induced by mechanical alignment between the optical sighting system and the heading sensor, magnetic local fields, magnetic declination and magnetic tilt; and
(i) recording the heading calibration angle in said memory to compensate further heading measurements.

11. A method of cooperative calibration of a heading sensor, comprising:
(a) providing a primary device including a heading sensor that provides measurements of heading, an optical sighting system with a fixed relative alignment to the heading sensor, a position sensor, a processor, memory and a communication link;
(b) providing a secondary device including a position sensor and a communication link;
(c) aiming the primary device's optical sighting system to acquire the secondary device;
(d) measuring with said heading sensor a sensed heading to the secondary device, wherein said heading sensor comprises at least one gyroscope to exploit the Earth's rotation and measure the sensed heading to the secondary device;
(e) measuring with the respective position sensors the positions of said primary and secondary devices;
(f) receiving at said primary device via the communication links the position of the secondary device;
(g) from said positions of said primary and secondary devices, calculating with said processor a true heading from said primary device to said secondary device;
(h) subtracting with said processor the true and sensed headings to form a heading calibration angle, said calculation of the heading calibration angle from the true and sensed heading encompassing errors induced by mechanical alignment between the optical sighting system and the heading sensor and drift of the gyroscope; and
(i) recording the heading calibration angle in said memory to compensate further heading measurements.

12. A method of cooperative calibration of a heading sensor, comprising:
(a) providing a primary device including a three-axis heading sensor that provides measurements of heading and pitch, an optical sighting system with a fixed relative alignment to the heading sensor, a Global Position System (GPS) receiver, a processor, memory and a communication link;
(b) providing a secondary device including a GPS receiver and a communication link;
(c) aiming the primary device's optical sighting system to acquire the secondary device;
(d) measuring with said heading sensor a sensed heading and a sensed pitch to the secondary device;

(e) sending a request from the primary device via the communication links to the secondary device for cooperative calibration;

(f) measuring with the respective GPS receivers time-synchronized positions relative to a fixed Earth coordinate system of said primary and secondary devices;

(g) receiving at said primary device via the communication links the position of the secondary device;

(h) from said positions of said primary and secondary devices, calculating with said processor a true heading and a true pitch from said primary device to said secondary device;

(i) subtracting with said processor the true and sensed headings to form a heading calibration angle and the true and sensed pitch to form a pitch calibration angle; and (j) recording the heading and pitch calibration angles in said memory to compensate further heading and pitch measurements.

13. The method of claim 12, wherein said processor uses the latitude and longitude of the primary and secondary positions to calculate a geodesic path from the primary to the secondary position on the surface of an ellipsoidal Earth model and provides the initial heading along this path as the true heading and wherein said processor creates a third position having the latitude and longitude of the secondary device and the elevation of the primary device, transforms the position of the primary device, secondary device and third position into Earth centered Earth Fixed (ECEF) coordinates, calculates a first vector between the primary and secondary positions, calculates a second vector between the primary and third positions, calculates an angle between the first and second vectors as the true pitch.

14. The method of claim 12, wherein said heading sensor comprises at least three magnetometers to sense different orthogonal components of the Earth's magnetic field and provide the sensed heading and sensed pitch to the secondary device, said calculation of the heading calibration angle from the true and sensed heading encompassing errors induced by mechanical alignment between the optical sighting system and the heading sensor, magnetic local fields, magnetic declination and magnetic tilt.

15. A primary device, comprising:
an optical sighting system for acquiring a secondary device that includes an Earth relative position sensor;
a heading sensor configured to provide measurements of heading with respect to true north and pitch to the secondary device when acquired by the optical sighting system;
an Earth relative position sensor configured to measure position of the primary device;
a communication link configured to receive the position of the secondary device measured by its Earth relative position sensor;
a processor configured to (a) compute a true heading relative to true North and a true pitch to the secondary device from the position measurements of the primary and remote devices and (b) compute heading and pitch calibration angles from the difference of the true and measured heading and pitch; and
memory for recording the heading and pitch calibration rotation to compensate further heading and pitch measurements.

16. The primary device of claim 15, wherein said processor is configured to send a request for cooperative calibration via the communication link to the secondary device to measure its position and transmit the position via the communication links back to the primary device.

17. The primary device of claim 15, wherein said primary and secondary Earth relative position sensors comprise Global Positioning System (GPS) receivers that provide position measurements with a time code, said processor calculating the true heading from time synchronized measurements of the positions of the primary and secondary devices.

18. The primary device of claim 15, wherein said processor uses the latitude and longitude of the primary and secondary positions to calculate a geodesic path from the primary to the secondary position on the surface of an ellipsoidal Earth model and provides the initial heading along this path as the true heading and wherein said processor creates a third position having the latitude and longitude of the secondary device and the elevation of the primary device, transforms the position of the primary device, secondary device and third position into Earth centered Earth Fixed (ECEF) coordinates, calculates a first vector between the primary and secondary positions, calculates a second vector between the primary and third positions, calculates an angle between the first and second vectors as the true pitch.

19. The primary device of claim 15, wherein said heading sensor comprises at least three magnetometers to sense different orthogonal components of the Earth's magnetic field and provide the sensed heading and sensed pitch to the secondary device, said calculation of the heading calibration angle from the true and sensed heading encompassing errors induced by mechanical alignment between the optical sighting system and the heading sensor, magnetic local fields, magnetic declination and magnetic tilt.

* * * * *